United States Patent
Gudat

[19]

[11] Patent Number: 6,002,362

[45] Date of Patent: Dec. 14, 1999

[54] APPARATUS AND METHOD FOR RECEIVING POSITION AND CONTROL SIGNALS BY A MOBILE MACHINE

[75] Inventor: Adam J. Gudat, Edelstein, Ill.

[73] Assignee: Caterpillar Inc., Peoria, Ill.

[21] Appl. No.: 09/062,976

[22] Filed: Apr. 20, 1998

[51] Int. Cl.[6] ................ G01S 5/02; H04B 7/185
[52] U.S. Cl. ................ 342/357.03; 342/357.06; 342/357.09; 701/215
[58] Field of Search .......... 342/357.01, 357.03, 342/357.06, 357.09; 701/213, 215

[56] References Cited

U.S. PATENT DOCUMENTS

| | | | |
|---|---|---|---|
| 5,202,829 | 4/1993 | Geir | 364/449 |
| 5,311,194 | 5/1994 | Brown | 342/357 |
| 5,440,491 | 8/1995 | Kawano et al. | 364/443 |
| 5,563,786 | 10/1996 | Torii | 364/424.02 |
| 5,644,318 | 7/1997 | Janky et al. | 342/357 |
| 5,702,070 | 12/1997 | Waid | 244/183 |
| 5,781,151 | 7/1998 | Stratton | 342/357 |

*Primary Examiner*—Thomas H. Tarcza
*Assistant Examiner*—Dao L. Pham
*Attorney, Agent, or Firm*—Steve D. Lundquist

[57] ABSTRACT

A base station receives GPS signals from GPS satellites and transmits a combined differential GPS (DGPS) signal and a command signal. At least one pseudolite receives the DGPS and command signals and combines the DGPS and command signals with a pseudo-GPS signal. A GPS receiver on a mobile machine receives GPS signals from GPS satellites, and the combined signal from the pseudolite. The position signals are delivered to a machine position processor to generate a machine position signal. The command signals are delivered to a machine control processor to generate a machine control signal. The machine position signal and the machine control signal are delivered to a machine navigator to control the mobile machine.

28 Claims, 6 Drawing Sheets

Fig_1_

APPARATUS AND METHOD FOR RECEIVING POSITION AND CONTROL SIGNALS BY A MOBILE MACHINE

TECHNICAL FIELD

This invention relates generally to an apparatus and method for receiving position and control signals by a receiver located on a mobile machine and, more particularly, to an apparatus and method for receiving global positioning system (GPS) signals and control signals by a GPS receiver located on the mobile machine.

BACKGROUND ART

The communications needs of mobile machines, particularly mobile machines in working environments, are becoming increasingly more complex as the work related expectations of the machines increase. For example, in the construction and mining industries, mobile machines must receive command related information, and position related information that needs to be increasingly more precise. This information may then be used to control actions of the mobile machine. If the mobile machine is autonomous, the information that is received by the mobile machine is even more important for proper operation of the machine.

The need to receive this diversity of information requires several pieces of communications equipment. The position related information may require a GPS antenna and receiver for receiving GPS signals, a differential GPS (DGPS) antenna and receiver for receiving a DGPS signal, and an antenna and receiver for receiving signals from pseudolites. The command related information may require additional antennas and receivers for receiving this data.

Attempts have been made to design and build antennas that package more than one antenna into a single unit. For example, in U.S. Pat. No. 5,691,726, Nichols et al. disclose an antenna combination that incorporates a GPS antenna and a DGPS antenna into one enclosure. However, additional antennas may still be required for receiving command information and pseudolite signals. In addition, even though the GPS and DGPS antennas are packaged into one enclosure, they are still two separate antennas and require separate preamplifiers and tuning networks, as well as diplexers to combine the two received signals.

In U.S. Pat. No. 5,625,363, Spilker discloses a system in which message signals are tramsmitted via a satellite uplink to available GPS satellites using the L3 transmission channel that is available. The messages are then transmitted by the GPS satellites back to earth, where they can be received by equipment that is in the propagation path of the transmitting satellites. This system may work well for specific applications, such as relaying data to receivers at geographically distant locations, provided the original transmitter and the intended receivers are both in view of the same GPS satellites. However, the system requires expensive satellite uplink equipment which must be directed toward the intended satellite relays. Additionally, many applications, e.g., work at a mining or construction site, is confined to a small geographic area, and does not require a system designed to send signals over vast portions of the earth.

The use of pseudolites has become increasingly popular at sites where precise and uninterrupted position signals are required. For example, at a mining site, the rough terrain caused by digging deep into the earth results in areas that are shadowed from GPS satellite signals. The proper placement of pseudolites to cover these shadowed areas is necessary to insure constant and precise position determinations of the mobile machines at the site. Sheynblat et al., in U.S. Pat. No. 5,646,630, discloses a network of pseudolites used to provide the required minimum of four GPS signals to enable precise position determination of mobile machines. These pseudolites, as disclosed by Sheynblat et al., operate at the same frequency as GPS, and use signals that are compatible with GPS antennas and receivers. Therefore, the pseudolites do not require any equipment for reception other than the receivers used to receive the actual GPS signals. However, the mobile machines at the site must still use additional antennas and receivers to receive command related signals.

The present invention is directed to overcoming one or more of the problems as set forth above.

DISCLOSURE OF THE INVENTION

In one aspect of the present invention an apparatus for receiving position and command signals by a mobile machine is disclosed. The apparatus includes a receiver to receive position and command signals, a machine position processor to receive position signals from the receiver and generate a machine position signal, and a machine control processor to receive command signals from the receiver and generate a machine control signal. The apparatus also includes a machine navigator to receive the machine position signal and the machine control signal.

In another aspect of the present invention a method for receiving position and command signals by a mobile machine is disclosed. The method includes the steps of receiving GPS signals by a GPS receiver located on the mobile machine, and receiving a combined pseudo-GPS signal and at least one of a DGPS signal and a command signal by the GPS receiver. The method also includes the steps of delivering the position signals to a machine position processor and generating a machine position signal, and delivering the command signal to a machine control processor and generating a machine control signal.

In yet another aspect of the present invention a system for communicating position and command signals to a mobile machine is disclosed. The system includes a base station to receive GPS signals and transmit at least one of a DGPS signal and a command signal, at least one pseudolite at predetermined positions at a site, each pseudolite adapted to receive the DGPS and command signals from the base station and transmit a combined pseudo-GPS, DGPS, and command signal, and a GPS receiver on the mobile machine to receive GPS signals from GPS satellites, and the combined signal from the pseudolite.

BEST MODE FOR CARRYING OUT THE INVENTION

Figure 1:
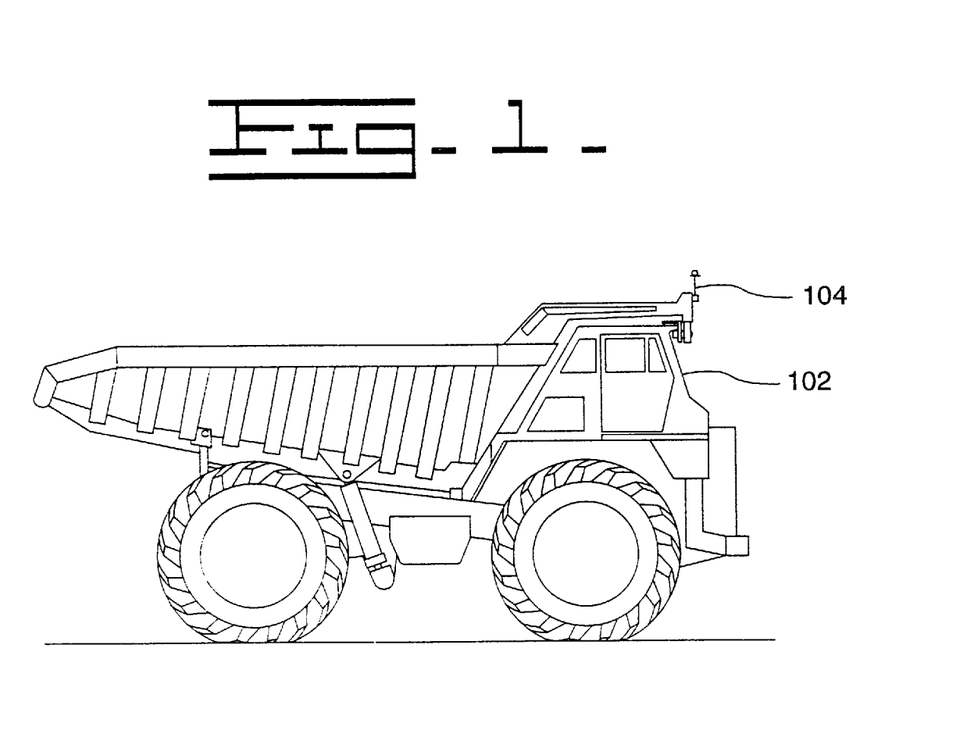
FIG. 1 is a diagrammatic illustration of a mobile machine adapted for use with the present invention.

Referring to the drawings, and with particular reference to FIG. 1, a diagrammatic illustration of a mobile machine 102 is shown. The mobile machine 102 of FIG. 1 is depicted as an off-road mining truck. However, other types of mobile machines, e.g., wheel loaders, track-type tractors, supervisor's trucks, maintenance trucks, and the like, may benefit from use of the present invention.

The mobile machine 102 illustrated in FIG. 1 is commonly used to haul material at a mining site. The mobile machine 102 may be controlled by an operator, controlled remotely, or may be configured to operate autonomously.

An antenna 104 is mounted on the mobile machine 102 at a location suitable for receiving signals from multiple directions. In addition, due to the harsh operating environments that the mobile machine 102 may be subjected to, e.g., a mining or construction site, the antenna 104 is preferably mounted at a location on the mobile machine 102 which offers some protection from the environment. In the preferred embodiment of the present invention, the antenna 104 is a GPS antenna configured to receive a plurality of GPS signals from a corresponding plurality of GPS satellites.

Figure 2:
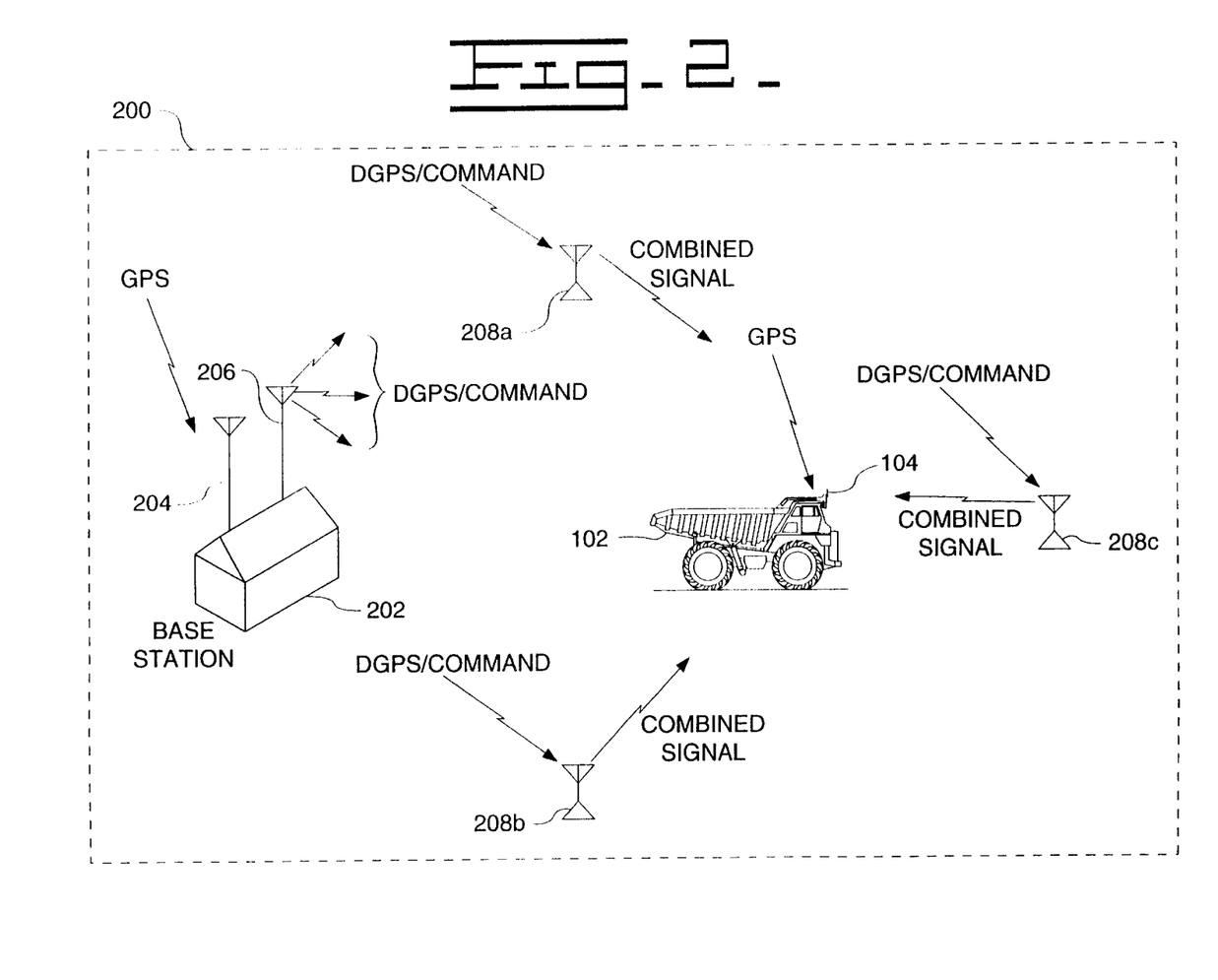
FIG. 2 is a diagrammatic illustration of an embodiment of the system of the present invention.

Referring now to FIG. 2, a diagrammatic illustration of a system 200 embodied in the present invention is shown.

A base station 202 located at a known geographical location at the site includes a GPS antenna 204 for receiving a plurality of GPS signals from a corresponding plurality of GPS satellites. The base station 202 then determines a differential position correction factor and generates a differential GPS (DGPS) signal to correct for error in the GPS position measurement. DGPS is well known in the art and will not be discussed further. The base station 202 may also be configured to monitor pseudolites and generate correction signals related to the pseudolite-generated position signals, and deliver the correction signals to the mobile machines. The functions of pseudolites are discussed in more detail below.

In addition, the base station 202 may generate a command signal to deliver commands to the mobile machine 102. In one embodiment, the base station 202 is configured to generate the command signal internally. For example, the base station 202 may serve as a home office for people who monitor and control various activities of mobile machines at the site. In another embodiment, the base station 202 may receive command information from a remote location and responsively generate a command signal. In yet another embodiment, the base station 202 may be set up as a relay station, receiving a command signal from a remote location to deliver to the mobile machines at the site.

A base station transmit antenna 206, located at the base station 202, is configured to transmit the DGPS and command signals. The DGPS and command signals are received by at least one pseudolite 208 located at a known geographic location at the site. As illustrated in FIG. 2, three pseudolites 208a,b,c are shown. However, any number of pseudolites, e.g., 1, 2, or more, may be located at the site.

As is well known in the art, pseudolites are used at sites such as mining sites to provide more precise and reliable position determination measurements. One type of pseudolite uses frequencies which differ from the GPS frequencies, and require an additional receiver on the mobile machine 102. Another type of pseudolite uses a signal similar to the GPS signals, known as a pseudo-GPS signal. The pseudo-GPS signal is directly compatible with GPS receivers. Therefore, no additional receiver on the mobile machine 102 is required to receive both true GPS signals and pseudo-GPS signals. In the preferred embodiment of the present invention, pseudolites which generate pseudo-GPS signals are used.

In the preferred embodiment, each pseudolite 208 may be configured to receive a differential pseudolite signal from the base station 202 to enhance the accuracy of the pseudolite determined position. Each pseudolite 208 may also receive command signals from the base station 202 to correct for clock drift errors of each pseudolite internal clock. Signals from a base station to a pseudolite to enhance the accuracy of the position determination of the pseudolite are well known in the art and will not be discussed further.

Each pseudolite 208 transmits a combined signal having the pseudo-GPS signal, the DGPS signal, and the command signal. The combined signal is described in greater detail below. The mobile machine 102, as it traverses the site, receives a plurality of GPS signals from a corresponding plurality of GPS satellites, and receives the combined signal from at least one of the pseudolites 208. Preferably, the mobile machine 102 receives the combined signal from at least one of the pseudolites 208 at all locations at the site, the pseudolites 208 being placed at locations to allow complete signal coverage throughout the site. In the preferred embodiment, the mobile machine 102 is adapted to receive a combined signal from a determined one of the plurality of pseudolites 208. For example, the mobile machine 102 may receive the combined signal from a pseudolite 208 that is determined to be within a minimum distance from the mobile machine 102. As another example, the pseudolites 208 may each have a defined area of propagation, the mobile machine 102 receiving the combined signal from the pseudolite 208 having the area of propagation in which the mobile machine 102 is located. Other methods for determining which pseudolite 208 to use to receive the combined signal may be employed without deviating from the spirit of the invention.

The GPS antenna 104 mounted on the mobile machine 102 receives the GPS signals and the combined signal, which is described in greater detail below. The GPS antenna 104, in the preferred embodiment, is mounted on the mobile machine 102 such that the plurality of GPS signals and the combined signal can be received as the mobile machine 102 moves about the site. More specifically, the GPS antenna 104 is mounted on the mobile machine 102 in direct line-of-sight view of the plurality of GPS signals and the combined signal from at least one of the pseudolites 208.

Figure 3:
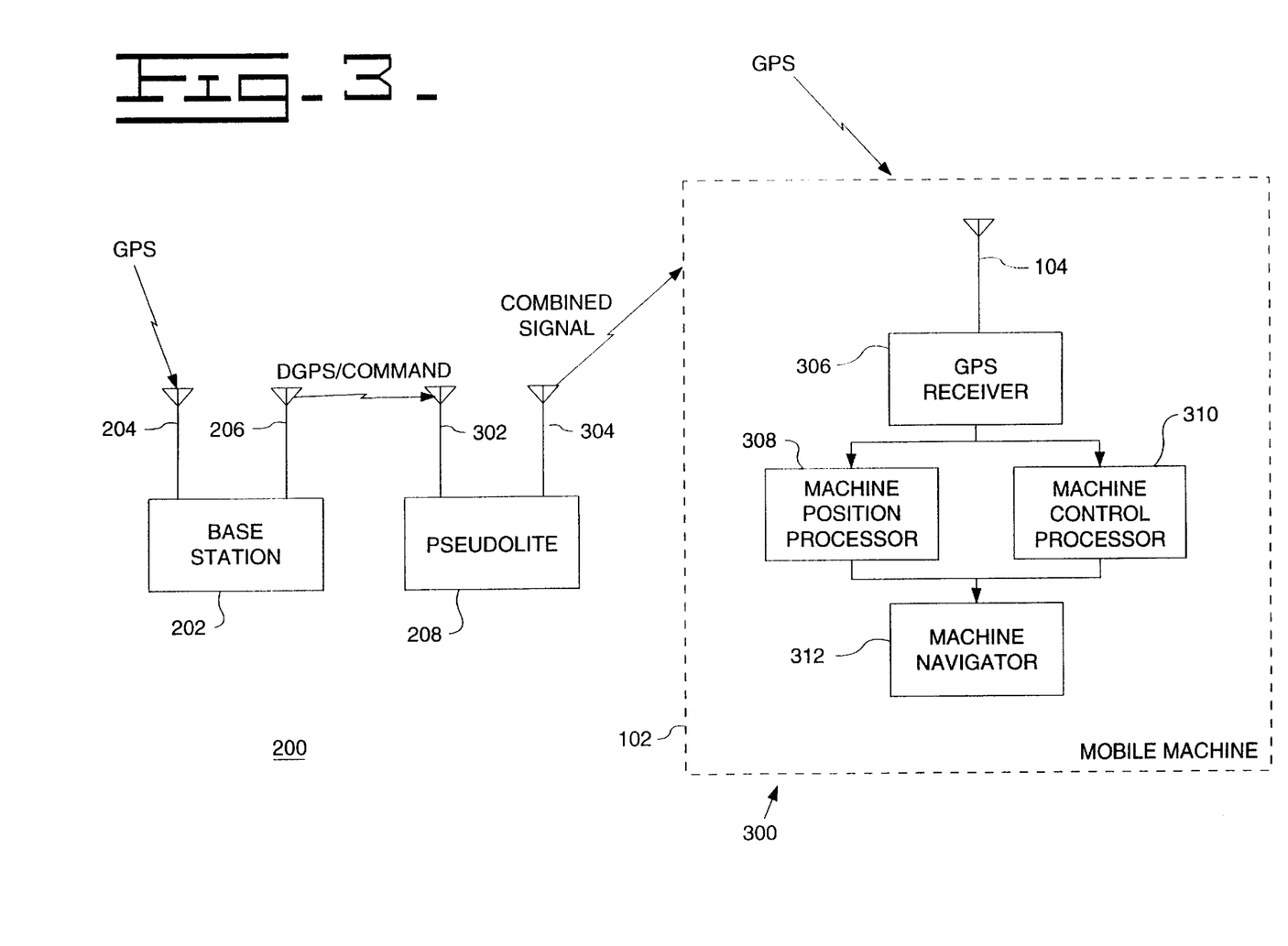
FIG. 3 is a diagrammatic illustration of an embodiment of the apparatus of the present invention.

Referring now to FIG. 3, a diagrammatic illustration of an embodiment of an apparatus of the present invention is shown. The GPS antenna 104 mounted on the mobile machine 102 receives the plurality of GPS signals and the combined signal. The GPS signals and the combined signal, i.e., the pseudo-GPS signal, the DGPS signal, and the command signal, are then delivered to a GPS receiver 306 located on the mobile machine 102. The GPS receiver preferably is a standard mobile GPS receiver known in the art and widely used to determine position on mobile machines.

A machine position processor 308 located on the mobile machine 102 is adapted to receive the GPS signals, the DGPS signal, and the pseudo-GPS signal from the GPS receiver 306. The machine position processor 308 can then determine the position of the mobile machine 102 in geographical site coordinates and generate a machine position signal.

A machine control processor 310 located on the mobile machine 102 is adapted to receive the command signals from the GPS receiver 306. The machine control processor 310 can then determine a set of commands and generate a machine control signal to respond to the commands.

Alternatively, the machine position processor 308 and the machine control processor 310 may be combined as one processor adapted to receive and process position signals and command signals, and generate a machine position signal and a machine control signal, respectively.

The command signal may be at least one of a data signal and a voice signal, and may be used to accomplish a variety of functions. For example, the command signal may be a data signal to deliver a set of commands to an autonomous mobile machine. As another example, the command signal may be a voice signal to deliver a voice message to an operator of a manned mobile machine. As yet another example, the command signal may be a data signal to deliver a data message to an operator of a manned mobile machine, e.g., delivery of data to a data port located on the mobile machine. Other examples may be used of types of command signals and messages that may be delivered to a mobile machine and would be well within the scope and purpose of the present invention.

A machine navigator 312 is located on the mobile machine 102 and is adapted to receive the machine position signal from the machine position processor 308 and the machine control signal from the machine control processor 310. The machine navigator 312 can then control the mobile machine 102 as a function of the machine position signal and the machine control signal.

Figure 4:
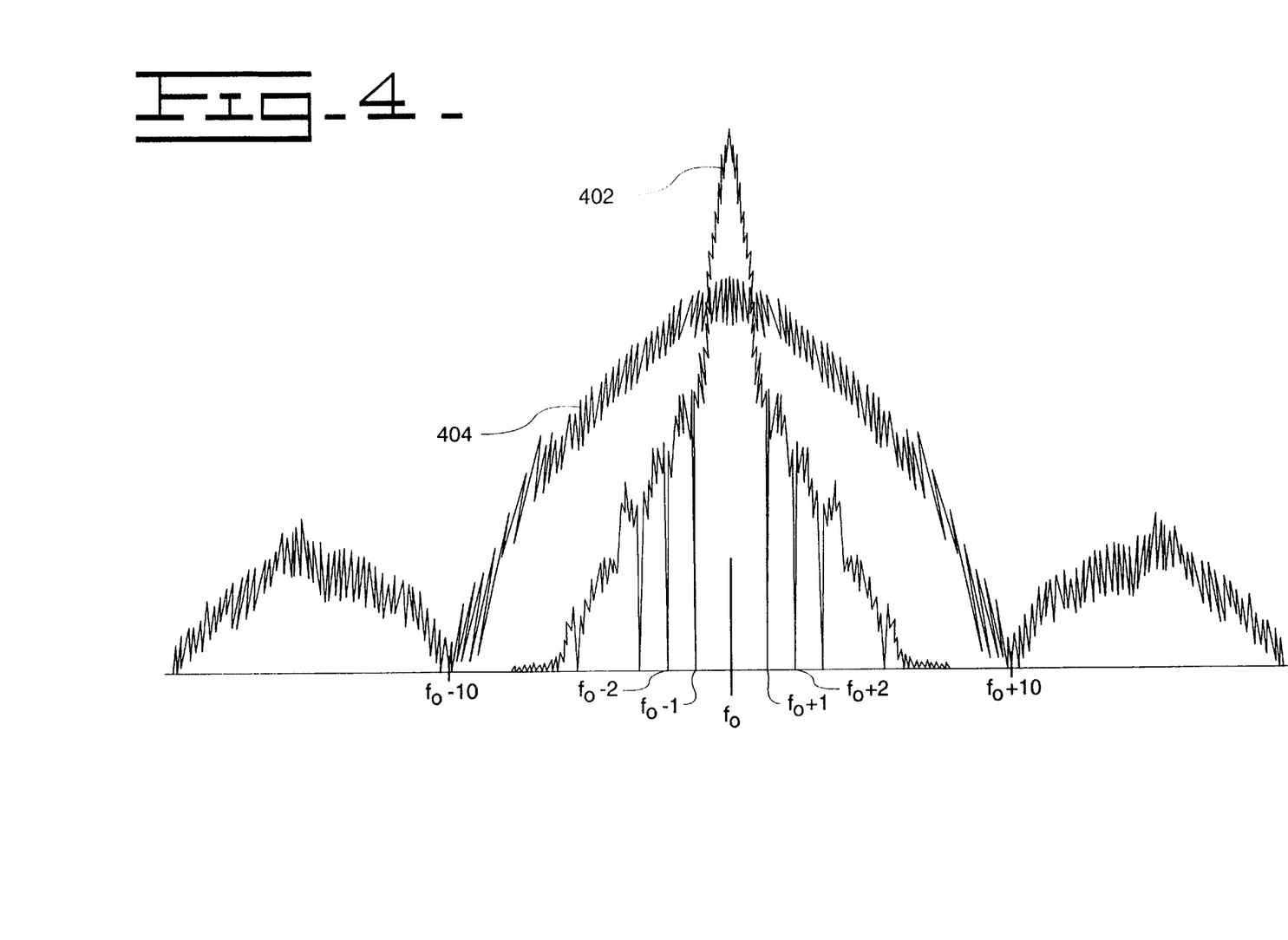
FIG. 4 is a diagrammatic illustration of a set of frequency components representing a GPS signal.

With reference to FIG. 4, a diagrammatic illustration of a set of frequency components representing a GPS signal is shown. In the preferred embodiment, the GPS signal contains both C/A code and P code modulation, which is well known in the art. Preferably, the frequency components represent a pseudo-GPS signal generated by a pseudolite and are of the same frequency as a GPS signal generated by a GPS satellite. In this preferred embodiment, the center frequency, $f_0$, is approximately 1575.42 MHz, equivalent to the L1 frequency of a GPS signal.

In FIG. 4, two modulated carriers are shown. A C/A code modulated carrier 402 is illustrated having a plurality of sidebands with nulls at frequencies $f_0+1$, $f_0+2$, $f_0-1$, and $f_0-2$. A P code modulated carrier 404 is illustrated having a plurality of sidebands with nulls at frequencies $f_0+10$ and $f_0-10$. Additional sidebands and nulls may exist for both the C/A code modulated carrier 402 and the P code modulated carrier 404, but are not shown in FIG. 4. The nulls may be described in general terms as existing at $f_0 \pm n$ frequencies for the C/A code modulated carrier 402 and at $f_0 \pm 10n$ frequencies for the P code modulated carrier 404, where n=1,2,3, etc. In the preferred embodiment, the sidebands for the C/A code modulated carrier 402 are located at intervals spaced approximately 1.023 MHz from $f_0$ and the sidebands for the P code modulated carrier 404 are located at intervals spaced approximately 10.23 MHz from $f_0$. The use of C/A code modulation carriers and P code modulation carriers are well known in the art with respect to GPS and will not be discussed further.

Figure 5:
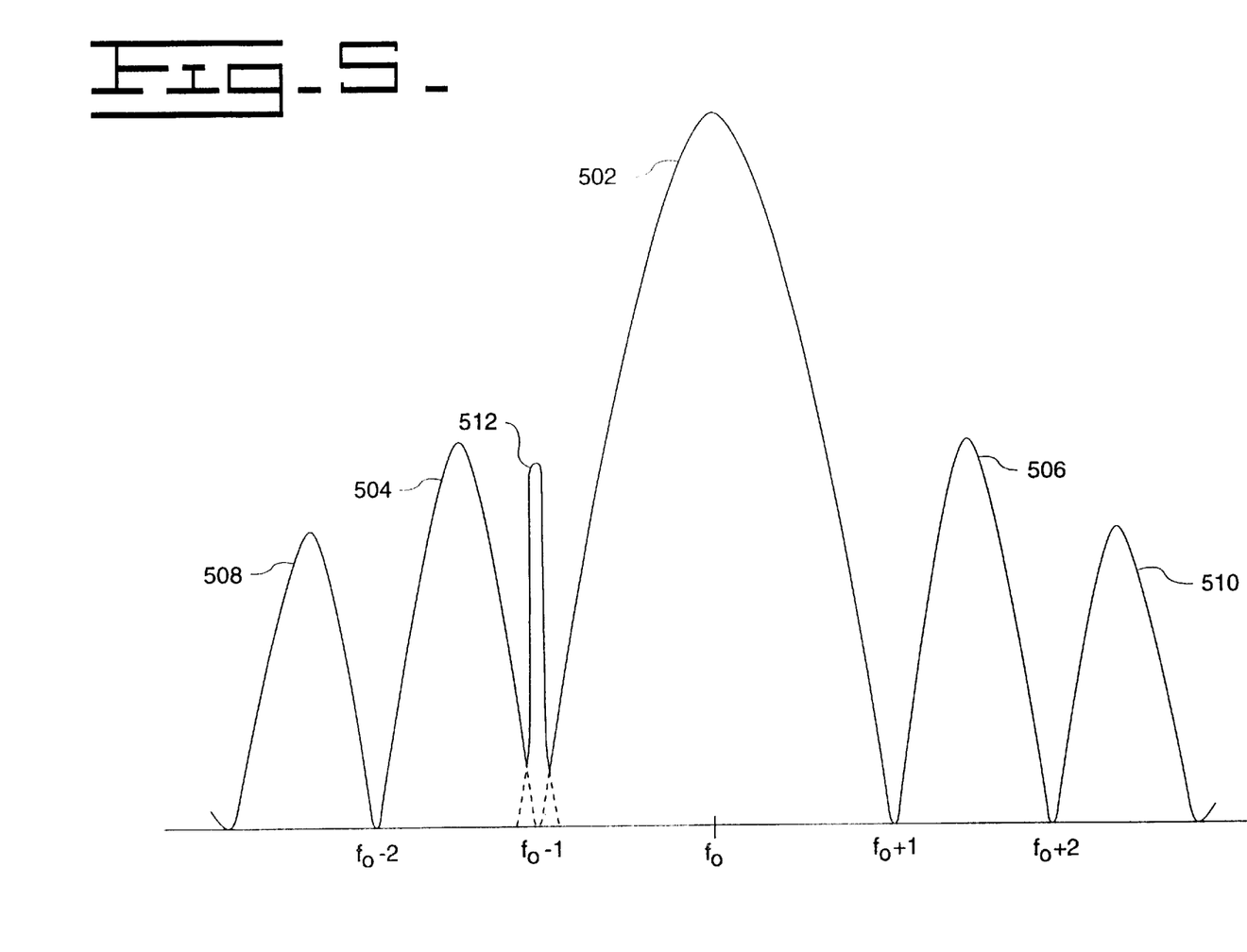
FIG. 5 is a diagrammatic illustration of an enlarged view of a portion of the set of frequency components depicted in FIG. 4 and illustrating an embodiment of the present invention.

With reference now to FIG. 5, a diagrammatic illustration of an enlarged view of a portion of the set of frequency components depicted in FIG. 4 is shown. More specifically, an enlarged diagrammatic view of a portion of the C/A code modulated carrier 402 is shown.

A fundamental pseudo-GPS frequency 502 is located at center frequency $f_0$, e.g., at approximately 1575.42 MHz. At frequencies above the fundamental pseudo-GPS frequency 502, a first upper sideband frequency component 506 and a second upper sideband frequency component 510 are shown. Separating the fundamental pseudo-GPS frequency 502, the first upper sideband frequency component 506, and the second upper sideband frequency component 510 are nulls at frequencies $f_0+1$ and $f_0+2$. At frequencies below the fundamental pseudo-GPS frequency 502, a first lower sideband frequency component 504 and a second lower sideband frequency component 508 are shown. Separating the fundamental pseudo-GPS frequency 502, the first lower sideband frequency component 504, and the second lower sideband frequency component 508 are nulls at frequencies $f_0-1$ and $f_0-2$.

A combined DGPS and command signal 512 is shown inserted at null $f_0-2$. However, in the preferred embodiment of the present invention, the combined DGPS and command signal 512 may be inserted at any single or plurality of nulls in the pseudo-GPS signal on either or both sides of the fundamental pseudo-GPS frequency 502.

It is to be understood that other embodiments for combining the pseudo-GPS signal, the DGPS signal, and the command signal may be used without deviating from the scope of the present invention. Additionally, the above embodiments for combining signals, as well as other embodiments for combining signals, are well known in the art and will not be discussed further.

Figure 6:
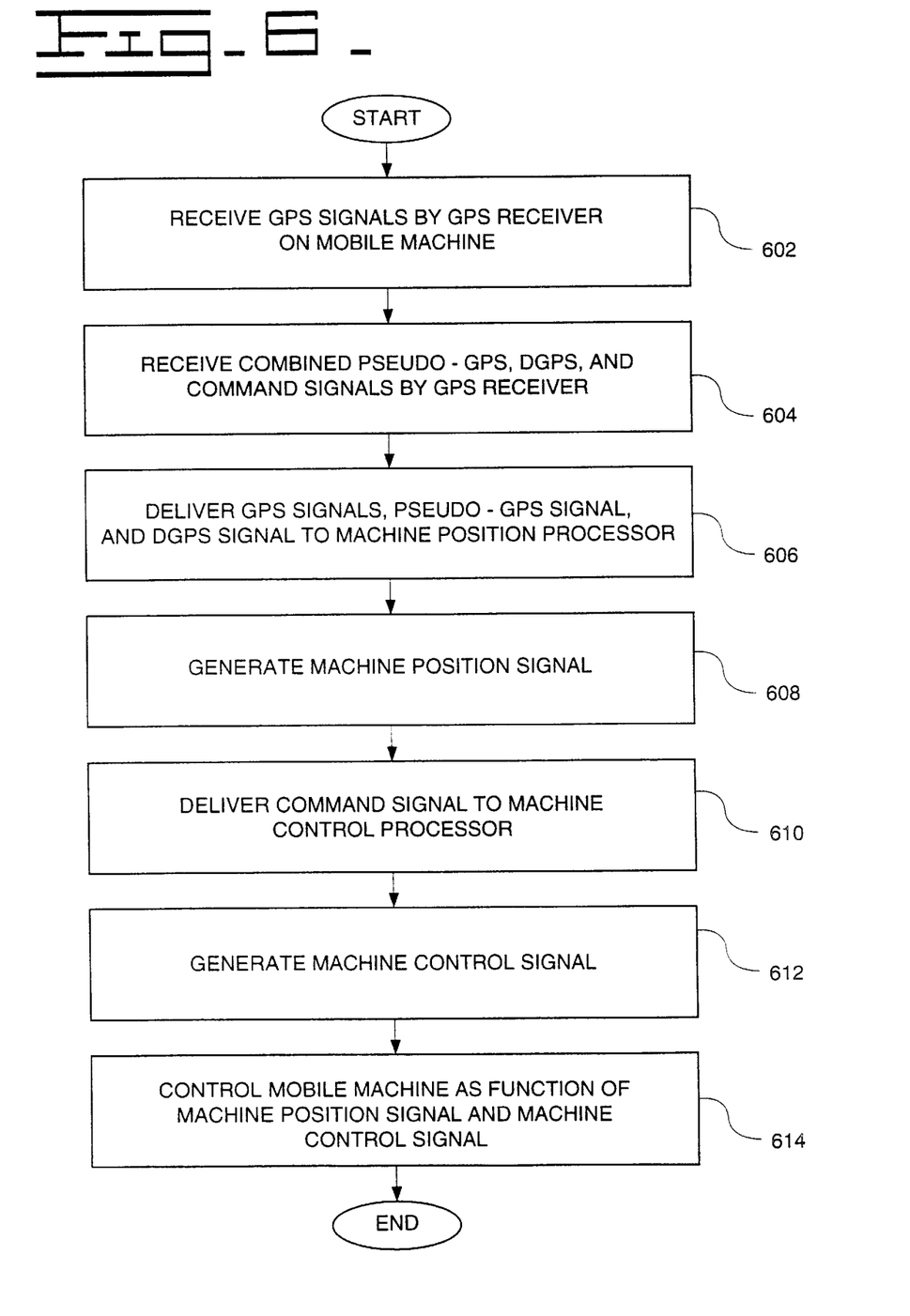
FIG. 6 is a flow chart illustrating a method of the present invention.

Referring now to FIG. 6, a flowchart illustrating a method of the present invention is shown.

In a first control block 602, a plurality of GPS signals from a corresponding plurality of satellites are received by a GPS receiver 306 located on the mobile machine 102. In a second control block 604, a signal comprising combined pseudo-GPS, DGPS, and command signals are received by the GPS receiver 306 on the mobile machine 102.

Control proceeds to a third control block 606, where the plurality of GPS signals, the pseudo-GPS signal, and the DGPS signal are delivered to a machine position processor 308. The machine position processor 308 responsively generates a machine position signal in a fourth control block 608. The machine position signal contains information related to the position of the mobile machine 102 in geographical site coordinates.

In a fifth control block 610, the command signal is delivered to a machine control processor 310. The machine control processor 310 responsively generates a machine control signal in a sixth control block 612. Preferably, the machine control signal contains information related to desired control of the operation of the mobile machine 102. Alternatively, the machine control signal may contain messages or data to deliver to an operator of the mobile machine 102.

In the preferred embodiment, the position signals and the command signals are routed to the respective machine position processor 308 and machine control processor 310 by routing the signals through filters. The use of filters to divide and route signals is well known in the art, and will not be discussed further.

In a seventh control block 614, the mobile machine 102 is controlled as a function of the machine position signal and the machine control signal.

Industrial Applicability

In an example of an application of the present invention, a mining site has several types of mobile machines which traverse the site. For example, off-road mining trucks haul material throughout the site, from dig locations to dump locations. Advances in technology have enabled these off-road mining trucks to be operated autonomously. As these autonomous trucks traverse the site, they require communication systems to receive information. For example, an autonomous mining truck requires position information, not only GPS data but also DGPS data and pseudo-GPS data for precise determination of the location of the truck at all times. The autonomous mining truck also requires periodic command information to know where to go, and what to do. The present invention provides a means to receive this diverse information without requiring multiple antennas and receiving systems.

Another type of mobile machine at a mining site is controlled by a human operator. For example, a supervisor, foreman, or maintenance person may traverse the site in a truck to perform a variety of duties. Multiple signals containing position data, command data, and messages may need to be received while traveling. The present invention offers the same advantages for the operator of a manned mobile machine as is described above for an autonomous mobile machine.

Other aspects, objects, and features of the present invention can be obtained from a study of the drawings, the disclosure, and the appended claims.

I claim:

1. An apparatus for receiving position and command signals by a mobile machine, comprising:

a base station adapted to receive GPS signals, and transmit at least one of a DGPS signal and a command signal;

a pseudolite adapted to receive the at least one of a DGPS signal and a command signal and transmit a combined pseudo-GPS signal and the at least one of a DGPS signal and a command signal, wherein the at least one of a DGPS signal and a command signal is combined with the pseudo-GPS signal by inserting the at least one of a DGPS signal and a command signal between at least two adjacent sideband frequency components of the pseudo-GPS signal:

a GPS receiver located on the mobile machine adapted to receive GPS signals, and the combined signals from the pseudolite;

a machine position processor located on the mobile machine adapted to receive the GPS, pseudo-GPS, and DGPS signals from the GPS receiver and responsively generate a machine position signal;

a machine control processor located on the mobile machine adapted to receive the command signals from the GPS receiver and responsively generate a machine control signal; and a machine navigator located on the mobile machine adapted to receive the machine position signal from the machine position processor and the machine control signal from the machine control processor.

2. An apparatus, as set forth in claim 1, wherein the machine navigator is adapted to control the mobile machine in response to receiving the machine position signal and the machine control signal.

3. An apparatus, as set forth in claim 1, wherein the command signal is at least one of a data signal and a voice signal.

4. An apparatus, as set forth in claim 3, wherein the command signal is a data signal for delivering a command to an autonomous mobile machine.

5. An apparatus, as set forth in claim 3, wherein the command signal is a voice signal for delivering a voice message to an operator of a mobile machine.

6. An apparatus, as set forth in claim 3, wherein the command signal is a data signal for delivering a data message to an operator of a mobile machine.

7. An apparatus, as set forth in claim 1, wherein the at least one of a DGPS signal and a command signal is combined with the pseudo-GPS signal by inserting the at least one of a DGPS signal and a command signal at a null between two adjacent sideband frequency components.

8. An apparatus, as set forth in claim 1, wherein the GPS receiver located on the mobile machine is adapted to receive a plurality of GPS signals from a corresponding plurality of GPS satellites, and the combined signal from the pseudolite.

9. An apparatus, as set forth in claim 1, wherein the GPS receiver located on the mobile machine includes an antenna mounted on the mobile machine.

10. An apparatus, as set forth in claim 9, wherein the antenna is mounted on the mobile machine such that signals from a plurality of GPS satellites and signals from at least one of a pseudolite and a base station can be received.

11. An apparatus, as set forth in claim 1, wherein the pseudolite includes a plurality of pseudolites located at predetermined positions at a site.

12. An apparatus, as set forth in claim 11, wherein the mobile machine traverses the site and receives the combined signal from a determined one of the plurality of pseudolites as a function of the location of the mobile machine at the site.

13. A method for receiving position and command signals by a mobile machine, including the steps of:

receiving a plurality of GPS signals by a base station;

transmitting at least one of a DGPS signal and a command signal from the base station;

receiving the at least one of a DGPS signal and a command signal by a pseudolite;

transmitting a combined pseudo-GPS signal and the at least one of a DGPS signal and a command signal from the pseudolite, wherein the at least one of a DGPS signal and a command signal is combined with the pseudo-GPS signal by inserting the at least one of a DGPS signal and a command signal between at least two adjacent sideband frequency components of the pseudo-GPS signal;

receiving a plurality of GPS signals and the combined signals from the pseudolite by a GPS receiver located on the mobile machine;

delivering the plurality of GPS signals, the pseudo-GPS signal, and the DGPS signal to a machine position processor and responsively generating a machine position signal;

delivering the command signal to a machine control processor and responsively generating a machine control signal; and delivering the machine position signal and the machine control signal to a machine navigator located on the mobile machine.

14. A method, as set forth in claim 13, further including the step of controlling the mobile machine as a function of the machine position signal and the machine control signal.

15. An apparatus, as set forth in claim 13, wherein the at least one of a DGPS signal and a command signal is combined with the pseudo-GPS signal by inserting the at least one of a DGPS signal and a command signal at a null between two adjacent sideband frequency components.

16. A method, as set forth in claim 13, wherein the command signal is at least one of a data signal and a voice signal.

17. A method, as set forth in claim 13, wherein the command signal is a data signal for delivering a command to an autonomous mobile machine.

18. A method, as set forth in claim 13, wherein the command signal is a voice signal for delivering a voice message to an operator of a mobile machine.

19. A method, as set forth in claim 13, wherein the command signal is a data signal for delivering a data message to an operator of a mobile machine.

20. A system for communicating position and command signals to a mobile machine, comprising:

a base station adapted to receive a plurality of GPS signals from a corresponding plurality of GPS satellites, and to transmit at least one of a DGPS signal and a command signal;

at least one pseudolite located at predetermined positions at a site, each of the at least one pseudolite adapted to receive the at least one of a DGPS signal and a command signal from the base station, and to transmit a combined pseudo-GPS signal and the at least one of a DGPS signal and a command signal, wherein the at least one of a DGPS signal and a command signal is combined with the pseudo-GPS signal by inserting the at least one of a DGPS signal and a command signal between at least two adjacent sideband frequency components of the pseudo-GPS signal;

a GPS receiver located on the mobile machine adapted to receive the plurality of GPS signals from the corresponding plurality of GPS satellites and the combined signal from one of the at least one pseudolite;

a machine position processor located on the mobile machine adapted to receive the GPS, pseudo-GPS, and DGPS signals from the GPS receiver and responsively generate a machine position signal;

a machine control processor located on the mobile machine adapted to receive the command signal from the GPS receiver and responsively generate a machine control signal; and a machine navigator located on the mobile machine adapted to receive the machine position signal and the machine control signal and responsively control the mobile machine.

21. A system, as set forth in claim 20, wherein the command signal is at least one of a data signal and a voice signal.

22. A system, as set forth in claim 20, wherein the command signal is a data signal for delivering a command to an autonomous mobile machine.

23. A system, as set forth in claim 20, wherein the command signal is a voice signal for delivering a voice message to an operator of a mobile machine.

24. A system, as set forth in claim 20, wherein the command signal is a data signal for delivering a data message to an operator of a mobile machine.

25. A system, as set forth in claim 20, wherein the at least one of a DGPS signal and a command signal is combined with the pseudo-GPS signal by inserting the at least one of a DGPS signal and a command signal at a null between two adjacent sideband frequency components.

26. A system, as set forth in claim 20, wherein the mobile machine traverses the site and receives the combined signal from a determined one of the plurality of pseudolites as a function of the location of the mobile machine at the site.

27. A system, as set forth in claim 20, wherein the GPS receiver located on the mobile machine includes an antenna mounted on the mobile machine.

28. A system, as set forth in claim 27, wherein the antenna is mounted on the mobile machine such that signals from a plurality of GPS satellites and signals from at least one of a pseudolite and a base station can be received.

* * * * *